United States Patent
Patil et al.

(10) Patent No.: US 11,640,146 B2
(45) Date of Patent: May 2, 2023

(54) SMART BUILDING APPLICATION TO PREPARE FOR EMPLOYEE ARRIVAL AND HEALTH RISKS

(71) Applicant: Johnson Controls Technology Company, Auburn Hills, MI (US)

(72) Inventors: Amit R. Patil, Naperville, IL (US); Steve E. Trivelpiece, Rancho Santa Margarita, CA (US); Michael J. Paolella, Lake Zurich, IL (US); Richard John Campero, Morgan Hill, CA (US); Michelangelo Palella, Bartlett, IL (US); Sanjeev Hasiza, Naperville, IL (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/206,280

(22) Filed: Mar. 19, 2021

(65) Prior Publication Data

US 2022/0299953 A1    Sep. 22, 2022

(51) Int. Cl.
  *G05B 15/02*   (2006.01)
  *G06Q 50/28*   (2012.01)
  *G08B 5/22*    (2006.01)
  *G08B 21/22*   (2006.01)

(52) U.S. Cl.
  CPC ............. *G05B 15/02* (2013.01); *G06Q 50/28* (2013.01); *G08B 5/222* (2013.01); *G08B 21/22* (2013.01)

(58) Field of Classification Search
  CPC ........ G05B 15/02; G06Q 50/28; G08B 5/222; G08B 21/22
  USPC ........................................................... 340/500
  See application file for complete search history.

(56) References Cited

U.S. PATENT DOCUMENTS

| | | | | |
|---|---|---|---|---|
| 9,378,601 | B2 * | 6/2016 | Ricci | .................... H04L 67/12 |
| 2010/0049651 | A1 * | 2/2010 | Lang | ..................... G06Q 30/04 |
| | | | | 705/38 |
| 2013/0054033 | A1 * | 2/2013 | Casilli | ................... H04L 12/282 |
| | | | | 700/90 |
| 2014/0306833 | A1 * | 10/2014 | Ricci | ..................... G06F 16/583 |
| | | | | 340/901 |
| 2014/0309789 | A1 * | 10/2014 | Ricci | ....................... G06F 16/25 |
| | | | | 700/276 |
| 2014/0309813 | A1 * | 10/2014 | Ricci | ................ H04N 21/41422 |
| | | | | 701/1 |
| 2014/0309814 | A1 * | 10/2014 | Ricci | ................ H04N 21/41422 |
| | | | | 701/2 |

(Continued)

*Primary Examiner* — Zhen Y Wu
(74) *Attorney, Agent, or Firm* — Foley & Lardner LLP

(57) ABSTRACT

A controller for making initiating actions in a building management system (BMS) is shown. The controller includes a processing circuit configured to receive location data relating to the building occupant located at a first location outside of a building. The processing circuit is configured to, in response to determining the first location is within a first distance range of the building, provide control signals to a first subsystem of the BMS. The processing circuit is configured to receive location data relating to the building occupant located at a second location outside of the building. The processing circuit is configured to, in response to determining that the second location is within a second distance range of the building, provide control signals to a second subsystem of the BMS.

20 Claims, 9 Drawing Sheets

(56) References Cited

U.S. PATENT DOCUMENTS

| | | | |
|---|---|---|---|
| 2015/0229626 A1* | 8/2015 | Hauhn | H04L 12/282 |
| | | | 726/4 |
| 2015/0312696 A1* | 10/2015 | Ribbich | H04W 4/029 |
| | | | 455/418 |
| 2016/0217631 A1* | 7/2016 | Petricoin, Jr. | G05B 15/02 |
| 2017/0067747 A1* | 3/2017 | Ricci | G08B 25/016 |
| 2018/0191829 A1* | 7/2018 | Morales | H04W 4/70 |
| 2018/0247070 A1* | 8/2018 | Evans | G08B 25/12 |
| 2018/0293824 A1* | 10/2018 | Turner | H04M 15/56 |

* cited by examiner

SMART BUILDING APPLICATION TO PREPARE FOR EMPLOYEE ARRIVAL AND HEALTH RISKS

BACKGROUND

The present disclosure relates to building management systems. More specifically, the present disclosure relates to building management systems that utilize location data of building occupants.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a controller for initiating actions in a building management system (BMS) based on a location of a building occupant. The controller includes a processing circuit including one or more processors and memory storing instructions that, when executed by the one or more processors, cause the one or more processors to perform operations. The operations include receiving location data relating to the building occupant located at a first location outside of a building. The operations include, in response to determining the first location is within a first distance range of the building, providing control signals to a first subsystem of the BMS. The operations include receiving location data relating to the building occupant located at a second location outside of the building. The operations include, in response to determining that the second location is within a second distance range of the building, providing control signals to a second subsystem of the BMS. In some embodiments, the first distance range is a different distance than the second distance range, and wherein the first subsystem is configured to operate different building equipment than the second subsystem.

In some embodiments, providing control signals to the first subsystem of the BMS includes notifying one or more building employees located within the building of the first location of the building occupant and preparing an item for pickup by the building occupant prior to the building occupant reaching the building.

In some embodiments, providing control signals to the first subsystem includes initiating a first preemptive action that prepares a zone of the building for arrival of the building occupant based on preferences of the building occupant and providing control signals to the second subsystem comprises initiating a second preemptive action that facilitates entrance of the building occupant into the building.

In some embodiments, providing control signals to the first subsystem of the BMS includes receiving a set of preferences relating to a comfortability of the building occupant within a building zone, the set of preferences including at least one of a preferred temperature, a preferred humidity percentage, or a preferred light setting and providing control signals to the first subsystem to satisfy at least one of the preferences in the set of preferences within the building zone.

In some embodiments, providing control signals to the second subsystem of the BMS includes calculating an estimated amount of time until the building occupant will arrive at the building and providing access to the building for the building occupant for a window of time based on the estimated amount of time.

In some embodiments, providing control signals to the second subsystem of the BMS includes determining that one or more user preferences indicate that the building occupant prefers to be assigned to a first building zone and, in response to determining that the first building zone is hazardous, assigning the building occupant to a second building zone.

In some embodiments, the first subsystem of the BMS is a lighting subsystem or a heating, ventilation, or air conditioning (HVAC) or an electrical subsystem. In some embodiments, the second subsystem of the BMS is a security subsystem or a safety subsystem.

In some embodiments, providing control signals to the first subsystem includes providing control signals to adjust an HVAC setpoint associated with the building and providing control signals to the second subsystem includes providing a power signal to an electronic device of an electronics system. In some embodiments, the first distance range is located such that an estimated time of arrival of the building occupant to the building from the first distance range is substantially similar to a time required to achieve the HVAC setpoint, and the second distance range is located such that an estimated time of arrival of the building occupant to the building from the second distance range is substantially similar to a time required to achieve a completion of powering on based on the provided power signal.

In some embodiments, the controller is further configured to calculate a time between determining the first location is within a first distance range of the building and determining that the second location is within a second distance range of the building. In some embodiments, in response to determining the calculated time is greater than a predetermined value, the controller is further configured to provide control signals that mitigate the provided control signals to a first subsystem of the BMS.

In some embodiments, the processing circuit is further configured to receive location data from a plurality of building occupants, the plurality of building occupants including the building occupant and pinging a user device of the building occupant to determine global positioning satellite (GPS) data for the first location and the second location.

Another implementation of the present disclosure is a method for initiating actions for a building management system (BMS) based on a location of a building occupant. The method includes receiving location data relating to the building occupant located at a first location outside of a building. The method further includes, in response to determining the first location is within a first distance range of the building, providing control signals to a first subsystem of the BMS. The method further includes receiving location data relating to the building occupant located at a second location outside of the building. The method further includes, in response to determining that the second location is within a second distance range of the building, providing control signals to a second subsystem of the BMS. In some embodiments, the first distance range is a different distance than the second distance range. In some embodiments, the first subsystem is configured to operate different building equipment than the second subsystem.

In some embodiments, providing control signals to the first subsystem of the BMS includes notifying one or more building employees located within the building of the first location of the building occupant and preparing an item for pickup by the building occupant prior to the building occupant reaching the building.

In some embodiments, providing control signals to the first subsystem includes initiating a first preemptive action that prepares a zone of the building for arrival of the building occupant based on preferences of the building occupant. In some embodiments, providing control signals to the second subsystem includes initiating a second preemptive action that facilitates entrance of the building occupant into the building.

In some embodiments, providing control signals to the first subsystem of the BMS includes receiving a set of preferences relating to a comfortability of the building occupant within a building zone, the set of preferences including at least one of a preferred temperature, a preferred humidity percentage, and a preferred light setting and providing control signals to the first subsystem to satisfy at least one of the preferences in the set of preferences within the building zone.

In some embodiments, providing control signals to the second subsystem of the BMS includes calculating an estimated amount of time that the building occupant will arrive at the building and providing access to the building for the building occupant for a window of time based on the estimated amount of time that will be required for the building occupant to reach the building.

In some embodiments, providing control signals to the second subsystem of the BMS includes determining that one or more user preferences indicate the building occupant prefers to be assigned to a first building zone and, in response to determining that the first building zone is hazardous, assigning the building occupant to a second building zone.

Another implementation of the present disclosure is a building management system (BMS) for making initiating actions based on a location of a building occupant, the BMS including a controller including a processing circuit including one or more processors and memory storing instructions that, when executed by the one or more processors, cause the one or more processors to perform operation. The operations include receiving location data relating to the building occupant located at a first location outside of a building. The operations include, in response to determining the first location is within a first distance range of the building, providing control signals to a first subsystem of the BMS. The operations include receiving location data relating to the building occupant located at a second location outside of the building. The operations include, in response to determining that the second location is within a second distance range of the building, providing control signals to a second subsystem of the BMS. In some embodiments, the first distance range is a different distance than the second distance range, and wherein the first subsystem is configured to operate different building equipment than the second subsystem.

In some embodiments, providing control signals to the first subsystem of the BMS includes notifying one or more building employees located within the building of the first location of the building occupant and preparing an item for pickup by the building occupant prior to the building occupant reaching the building.

In some embodiments, providing control signals to the first subsystem includes initiating a first preemptive action that prepares a zone of the building for arrival of the building occupant based on preferences of the building occupant and providing control signals to the second subsystem comprises initiating a second preemptive action that facilitates entrance of the building occupant into the building.

In some embodiments, the building occupant is an opt-in loyalty customer of a retailer.

DETAILED DESCRIPTION

Overview

Referring generally to the FIGURES, systems and methods for adjusting operation of a building management system (BMS) based on the detected location of one or more building occupants is shown, according to some embodiments. The location data can be provided over an application on the user devices of the one or more building occupants that, where the GPS data is continually or periodically transmitted. In other embodiments, the data is provided in response to a request from the BMS, such as a global positioning satellite (GPS) ping. Once received, the location data can indicate the location of a building occupant, which can include building occupants within the building, or future building occupants that are currently outside the building. In some embodiments, the location data is provided to the BMS from a radio navigation circuit (e.g., a GPS circuit, etc.) located within a user device (e.g., a smartphone, etc.) of the user.

The BMS can implement several adjustments, updates, changes, or notifications based on the received location data. In a general embodiment, the BMS can receive location data of a soon-to-be building occupant that will be entering the building at a point in the near future (e.g., 5 min., 10 min., etc.). Based on the estimated time of arrival, the BMS can facilitate the access features for the building occupant such that entering the building is completed in a more efficient manner. These features can include (i) giving access (e.g., unlocking the front door, notifying security, registering their badge ID with the front desk, etc.) to the soon-to-be occupant for a window of time to enter the building based on their estimated time of arrival, (ii) turning on the building occupant's equipment (e.g., workstation, laptop, etc.), setting the temperature of the building occupant's office to a preferred temperature of the building occupant, (iii) notifying security of the building occupant's information and the fact that the building occupant is entering the building, and other features discussed in detail below.

Building Management System and HVAC System

Building Site

Figure 1:
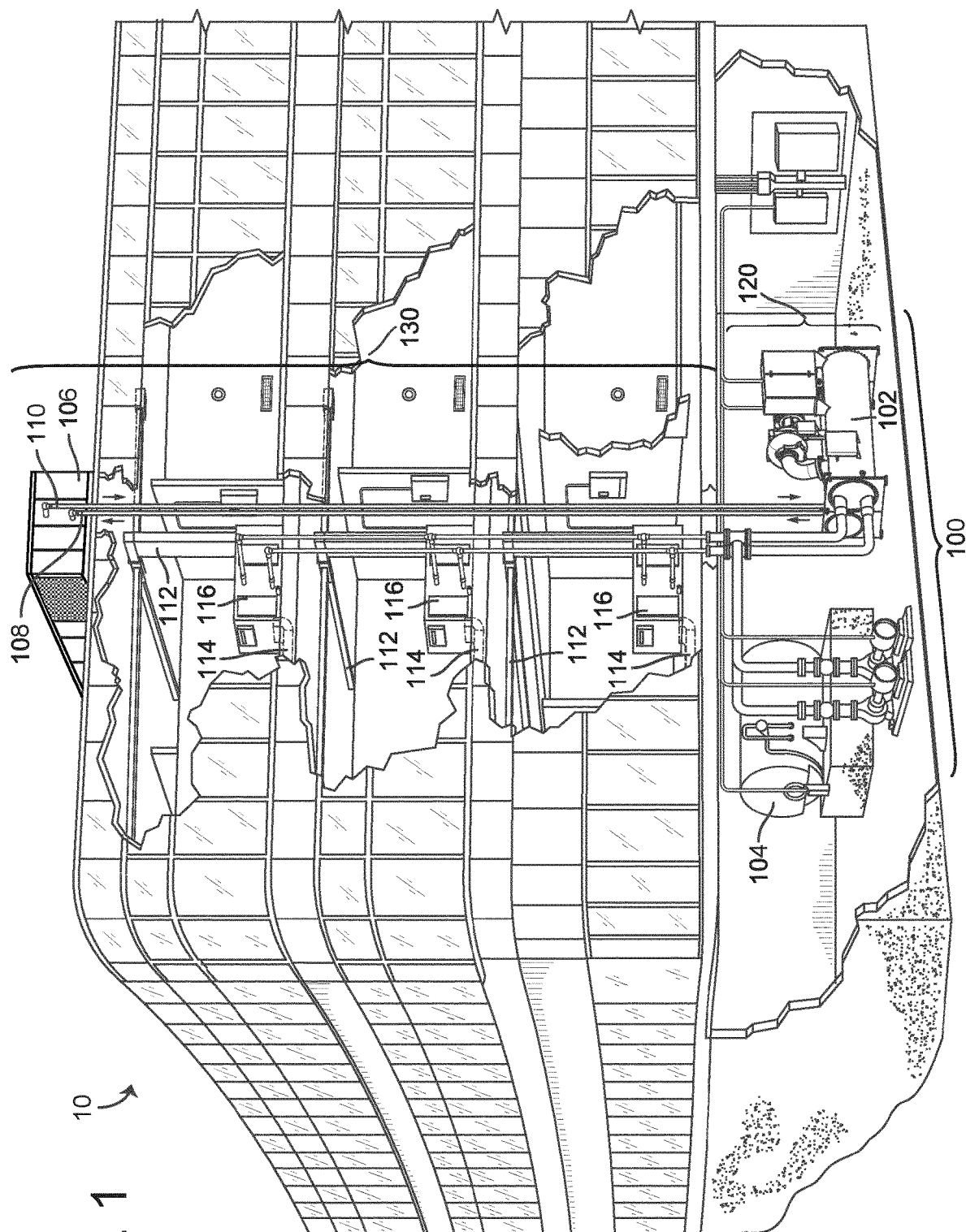
FIG. 1 is a drawing of a building equipped with a HVAC system, according to an exemplary embodiment.

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
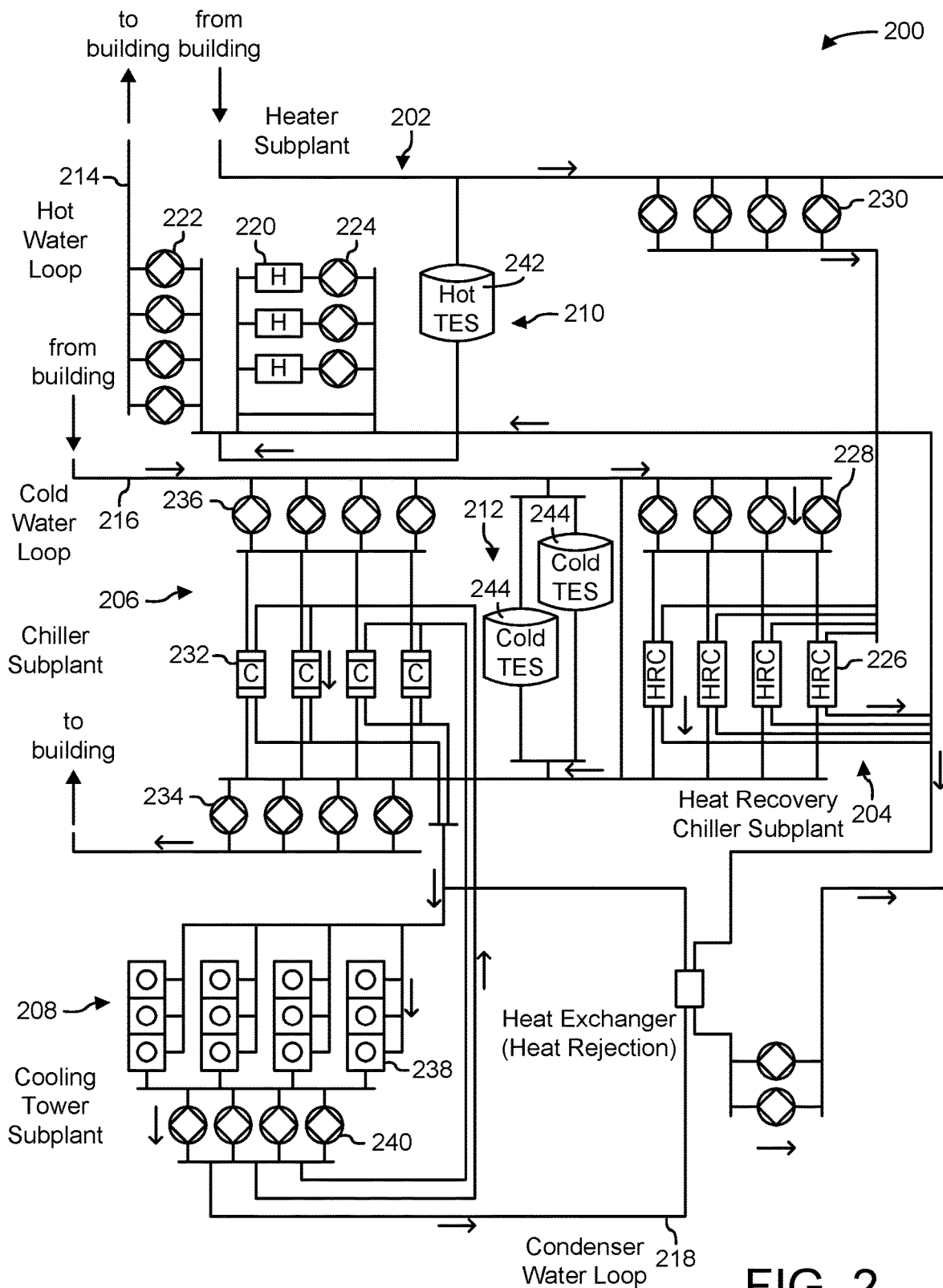
FIG. 2 is a block diagram of a waterside system which can be used to serve the building of FIG. 1, according to an exemplary embodiment.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
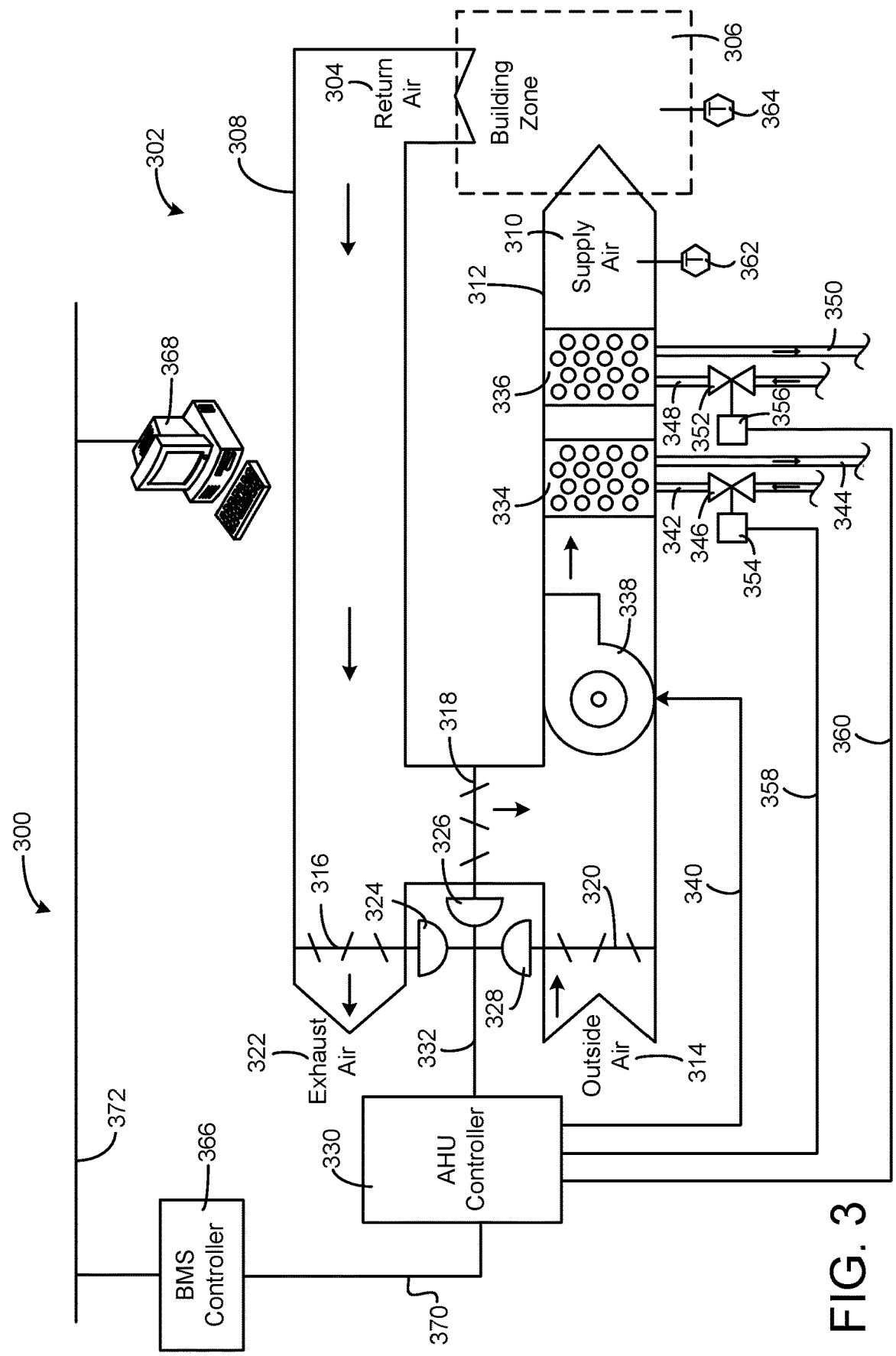
FIG. 3 is a block diagram of an airside system which can be used to serve the building of FIG. 1, according to an exemplary embodiment.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
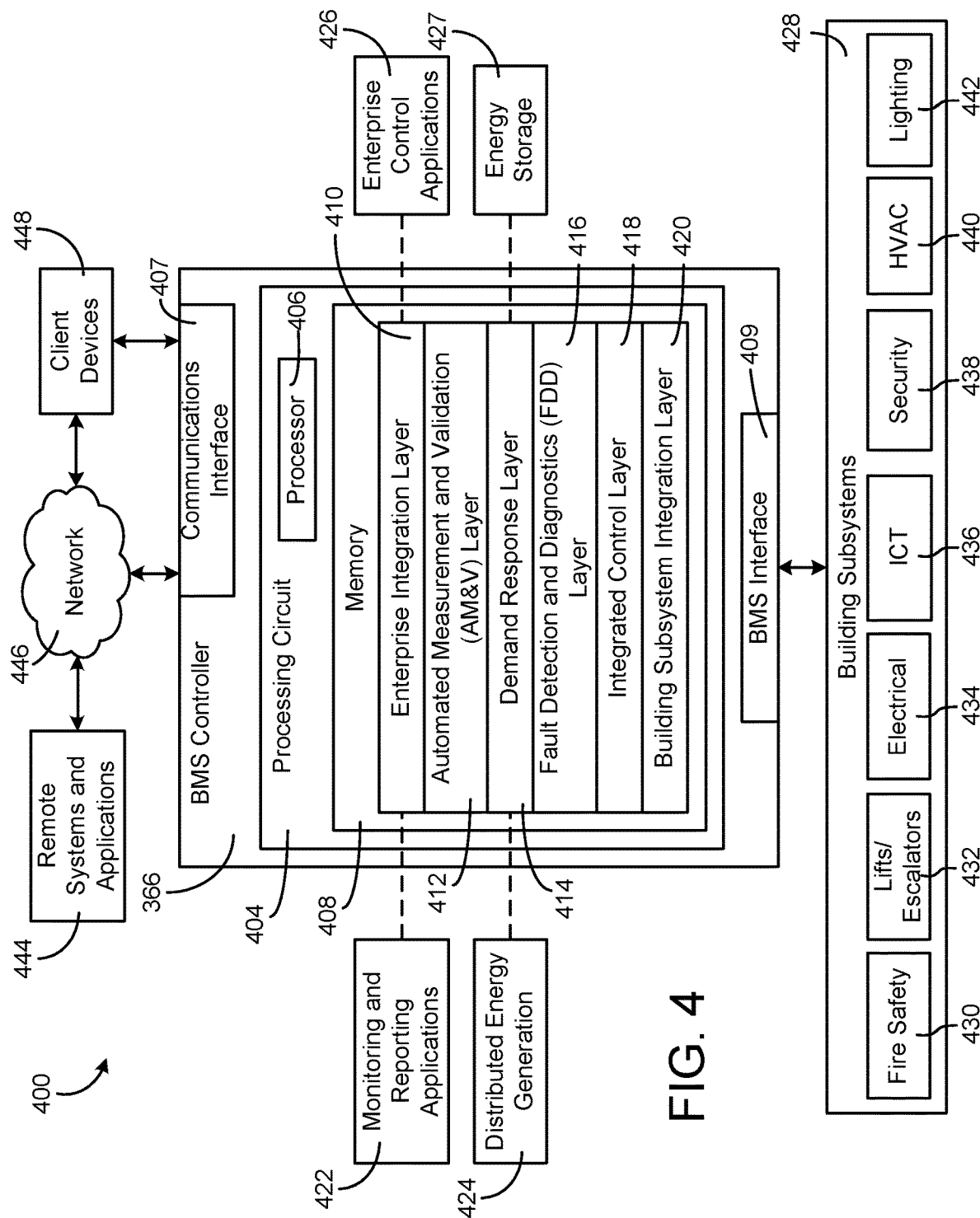
FIG. 4 is a block diagram of a building management system (BMS) which can be used to monitor and control the building of FIG. 1, according to an exemplary embodiment.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing set points, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing set points) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what set points can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Location Data System Overview

Figure 5:
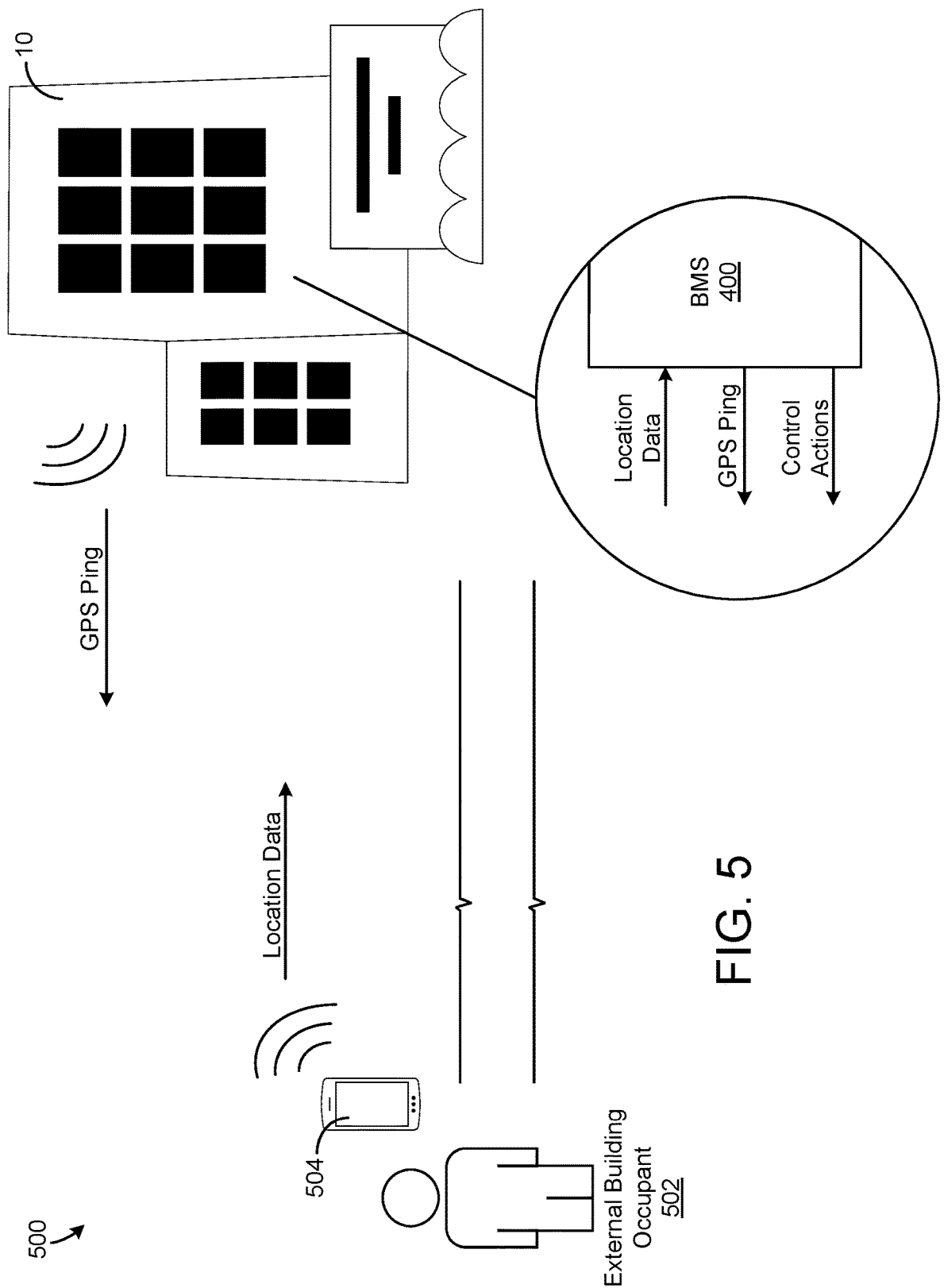
FIG. 5 is a diagram of a building location control system, which can be implemented in the building of FIG. 1, according to some embodiments.

Referring now to FIG. 5, a system 500 for detecting locations of building occupants in a BMS is shown, according to some embodiments. System 500 may be incorporated partially or entirely within BMS 400, or within any other system (e.g., system 100, system 200, system 300, etc.) described herein. System 500 may be configured to receive location data from one or more building occupants (e.g., people currently located within the building, people that will eventually enter the building but are currently outside of the building, etc.), and make control adjustments based on the received location data. System 500 is shown to include external building occupant 502, user device 504, building 10, and BMS 400.

External building occupant 502 can be an employee going to work within building 10, a client, a customer, or any other type of person associated with building 10. External building occupant 502 may include user device 504 on their person. In some embodiments, user device 504 is a smartphone, but could be any other processing device capable of providing the location of external building occupant 502 to BMS 400, such as a tablet, laptop, etc. BMS 400 may provide a location request (e.g., in the form of a GPS ping, etc.) to one or more user devices of building occupants located within or near (e.g., 5 m, 10 m, 20 m, 50 m, 100 m, etc.) building 10. In response, user device 504 (e.g., and other user devices that received the same location request) may provide the location data to BMS 400. BMS 400 may then be able to make control decisions (e.g., adjustments to BMS 400 and the subsystems therein, adjustments to waterside system 200, adjustments to airside system 300, etc.) based at least in part on the received location data.

External building occupant 502 may be located at any reasonable distance from building 10. For example, external building occupant is commuting to work, and—in response to a GPS ping from BMS 400—indicates to BMS 400 that they are approximately 1500 meters away from building 10. BMS 400 may determine that this will take an estimated 10 minutes for external building occupant 502 to arrive at the entrance of building 10. As such, BMS 400 will provide a 15-minute time window in which the badge of external building occupant 502 will work at the entrance of building 10 (e.g., with the 7.5 minute mark being at the estimated time of arrival). This can heighten security, as the badge will only allow external building occupant 502 to enter at a certain estimated arrival time, rather than at any point in the day (e.g., if the badge was stolen). Furthermore, BMS 400 may also boot up the work equipment (e.g., workstation, etc.) for external building occupant 502 at or near the estimated arrival time, such as 5 minutes before the estimated arrival time, to increase efficiency for external building occupant 502 when they begin working. Other control actions and responses to the received location data are described in greater detail below.

Figure 6:
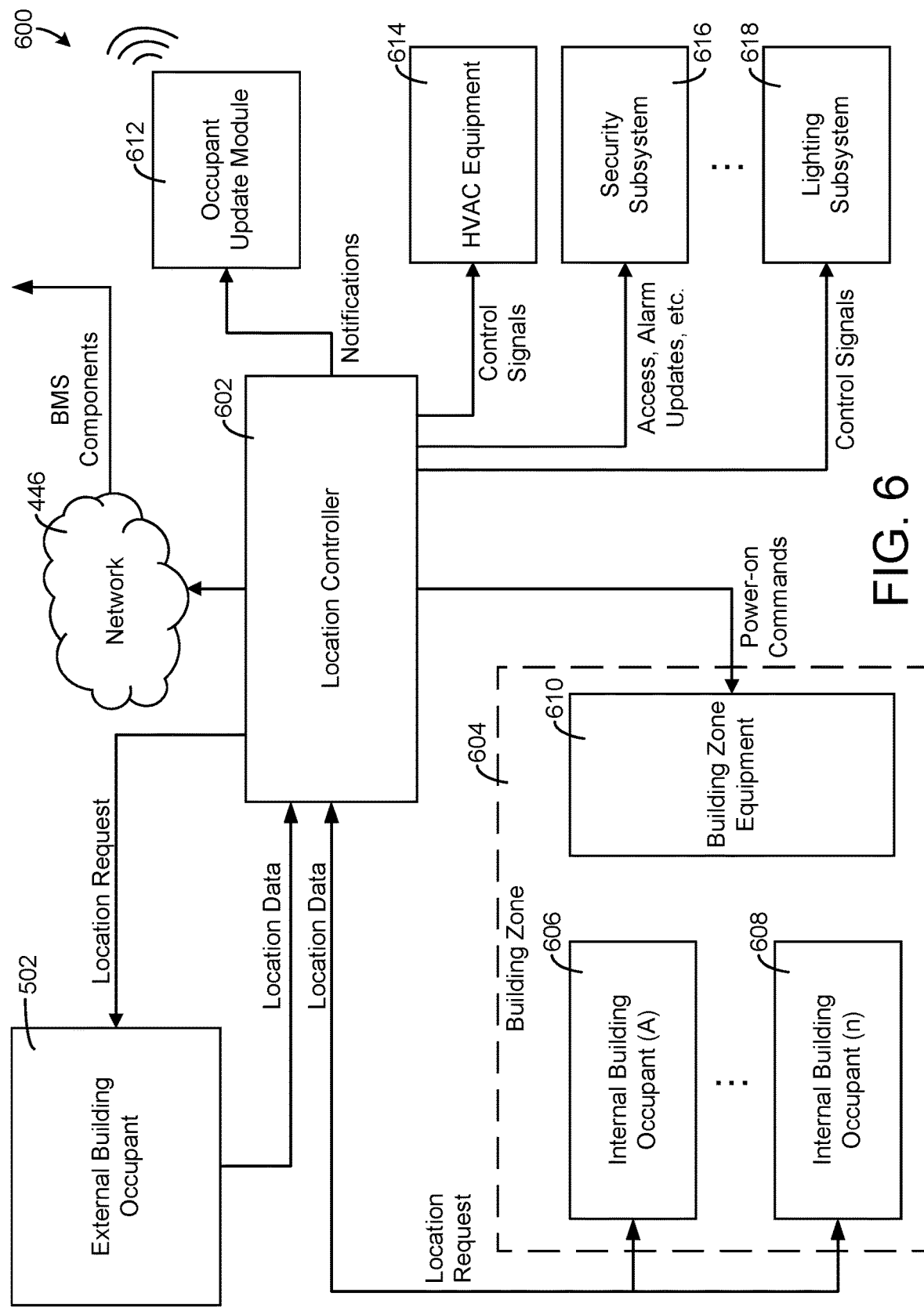
FIG. 6 is a block diagram of a location control system, which can be implemented in the system of FIG. 5, according to some embodiments.

Referring now to FIG. 6, a system 600 for facilitating the location requests/responses and the subsequent control actions based thereon are shown, according to some embodiments. System 600 may incorporate some or all features and/or functionality of system 500, and vice versa. Additionally, system 600 may be incorporated partially or entirely within HVAC system 100, waterside system 200, airside system 300, BMS system 400, or any combination thereof. System 600 is shown to include external building occupant 502, location controller 602, building zone 604, internal building occupant (A) 606, internal building occupant (n) 608, building zone equipment, occupant update module 612, HVAC equipment 614, security subsystem 616, and lighting subsystem 618.

In a general embodiment, location controller 602 may receive location data from external building occupants (e.g., external building occupant 502), and provide various instructions (e.g., notifications, control signals, access updates, alarm updates, etc.) to equipment to improve energy efficiency, comfortability, and/or security within building 10.

While not shown in FIG. 6, location controller 602 may provide notifications to building occupants that pertain to their present location in relation to building 10. For example, location controller 602 provides a text notification to user device 504 that states, "Hi John, we've noticed that you will be arriving at the building shortly. We've provided your badge with access to Entrance A from 8:50-9:05 AM," after determining that John will be arriving at building 10 at an estimated time of 9:00 AM. Location controller 602 may include some or all functionality of BMS controller 366. Additionally, location controller 602 may be incorporated partially or entirely within BMS controller 366.

In another example, building 10 is a building that allows clients to come and pick up packages. Location controller 602 receives location data of the client coming to pick up the package. Once location controller 602 determines that they are within an acceptable range, a notification may be send to user device 504 indicating that the package will be ready to be picked up when they arrive. Concurrently, location controller 602 will provide a notification to the staff inside of building 10 to prepare the package (e.g., retrieve it from the warehouse, etc.) and make sure it is ready to be picked up prior to external building occupant arriving at building 10.

Building zone 604 may be or include any region within building 10. In some embodiments, building zone 604 is a room, a floor, the building itself, or a region within building 10 that is clearly defined by walls (e.g., HVAC zones, etc.). Building zone 604 is shown to include internal building occupant (A) 606 through internal building occupant (n) 608 and building zone equipment 610. In some embodiments, one or more building occupants may be located within building 10 inside building zone 604. After location controller 602 receives location data of internal building occupant (A) through internal building occupant (n) 608, control actions may be implemented.

For example, internal building occupant 608 needs to access another portion of building 10, that is blocked by a locked door. Once location controller 602 receives location data indicating that internal building occupant 608 is near (e.g., within 10 feet, within 20 feet, etc.), the door may unlock for a window of time (e.g., 5 seconds, 20 seconds, etc.) to allow internal building occupant 608 to enter the restricted area while maintain security. In the above example, the door is unlocked using a badge on the person of internal building occupant 608, and location controller 602 allows the badge to work in unlocking the door for the window of time.

In another example, the location of internal building occupant 606 is tracked throughout the day at given intervals (e.g., every 15 minutes, every hour, etc.). The following day, internal building occupant 606 tests positive for coronavirus disease 2019 (COVID-19) and reports this information to BMS 400 (e.g., by updating an administrator, via an online portal, etc.). BMS 400 and/or location controller 602 can analyze the location of internal building occupant 606 from the previous day to perform contact tracing and determine whether other building occupants may have been infected, and if any building zones are considered hazardous until further notice. In the above example, other building occupant's location can be monitored at certain intervals and any number of hours or days can be logged.

Location controller 602 is further configured to provide notifications to occupant update module 612. In some embodiments, occupant update module 612 is located within location controller 602 and is configured to send notifications to building occupants (e.g., external building occupant 502, internal building occupant 606, etc.). Occupant module 612 may be configured to relay the control actions that have occurred in response to receiving the location data of the building occupant.

For example, external building occupant 502 ("John") provides location data to location controller 602, indicating that John is approximately 1000 m away from building 10. Location controller 602 turns on John's workstation, sends control signals to HVAC equipment 614, and sends a notification—via occupant update module 612—to John, stating, "Hi John, we've noticed you are almost to the building, so we turned on your computer and turned on the air conditioning in your office." Other features and/or preferences for John's office may also be engaged.

Occupant update module 612 may be configured to provide updates to location controller 602 based on responses from building occupants. For example, external building occupant 502 messages location controller 602—via occupant update module 612—in response to a message, "What would you like your office temperature to be when you arrive to work?" with the reply, "71 degrees." Location controller 602 interprets the message and provides control signals to HVAC equipment to achieve a setpoint of 7° F. in the office of external building occupant 502.

Location controller 602 is further configured to provide control signals to HVAC equipment 614, access updates and alarm updates to security subsystem 616, and control signal to lighting subsystem 618. Security subsystem 616 an lighting subsystem 618 may be identical or substantially similar to security subsystem 438 and lighting subsystem 442. In some embodiments, location controller 602 is configured to provide signals to any of the building subsystems 428 described above, including fire safety subsystem 430 and electrical subsystem 534.

Location Control Functionality

Figure 7:
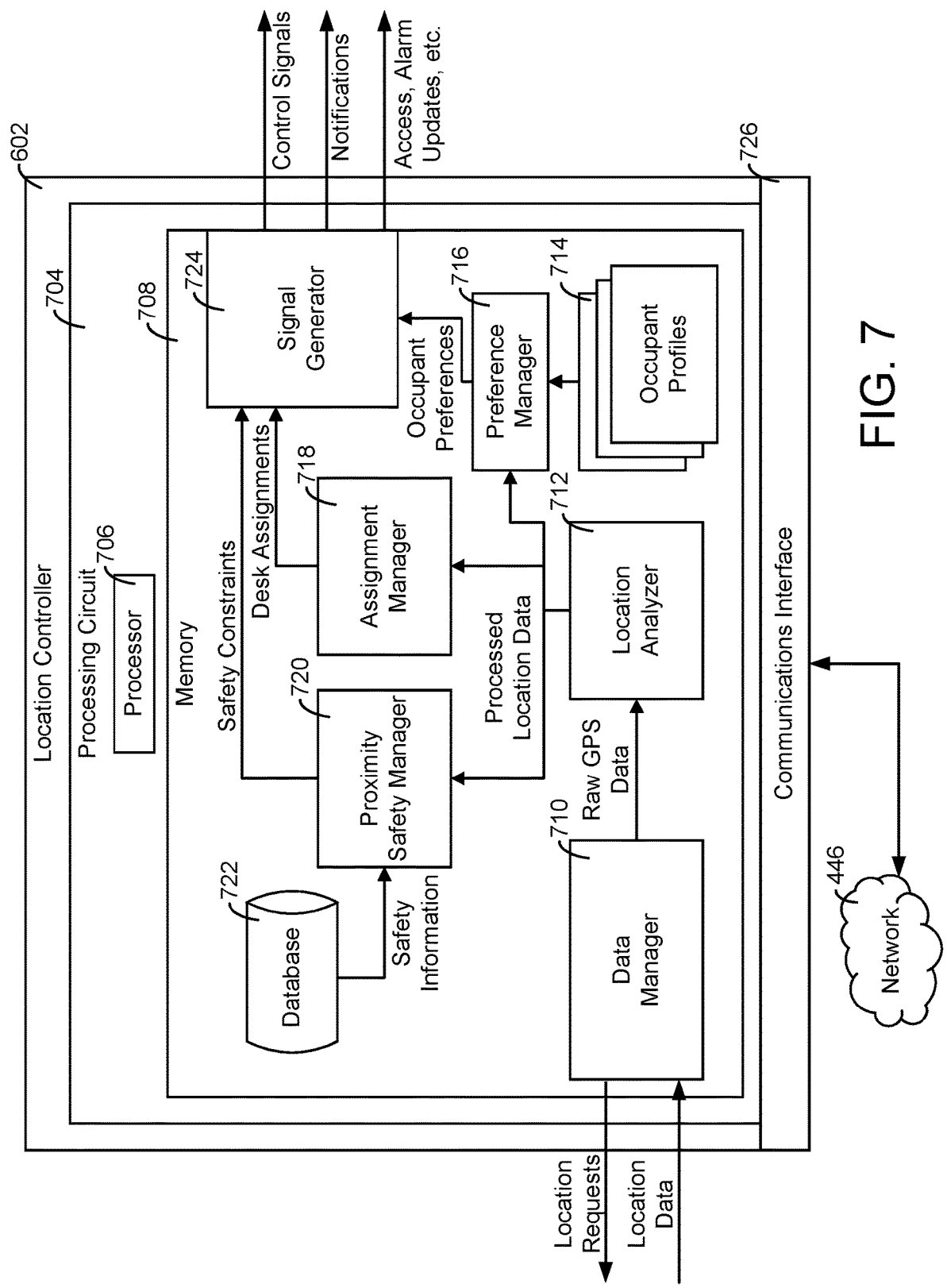
FIG. 7, is a block diagram of a location controller, which can be implemented in the location control system of FIG. 6, according to some embodiments.

Referring now to FIG. 7, a block diagram of location controller 602 is shown, according to some embodiments. Location controller 602 is shown to include processing circuit 704 and communications interface 726. Processing circuit 704 is shown to include processor 706 and memory 708. Processing circuit 704 can be communicably connected to communications interface 726 such that processing circuit 704 and the various components thereof can send and receive data via communications interface 726. Processor 706 can be implemented as a general purpose processor, an application specific integrated circuit (ASIC), one or more field programmable gate arrays (FPGAs), a group of processing components, or other suitable electronic processing components.

Memory 708 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 708 can be or include volatile memory or non-volatile memory. Memory 708 can include database components, object code components, script components, or any other type of information structure for supporting the various activities and information structures described in the present application. According to an example embodiment, memory 708 is communicably connected to processor 706 via processing circuit 704 and includes computer code for executing (e.g., by processing circuit 704 and/or processor 706) one or more processes described herein. In some embodiments, location controller 602 is implemented within a single computer (e.g., one server, one housing, etc.). In various other embodiments location controller 602 can be distributed across multiple servers or computers (e.g., that can exist in distributed locations).

Communications interface 726 can facilitate communications between location controller 602 and external applications for allowing user control, monitoring, and adjustment to location controller 702 and/or subsystems 428. Communications interface 726 can also facilitate communications between location controller 602 and building subsystems 428 (e.g., HVAC, lighting security, lifts, power distribution, business, etc.).

Communications interface 726 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interface 726 can be direct (e.g., local wired or wireless communications) or via a communications network 446 (e.g., a WAN, the Internet, a cellular network, etc.). For example, communications interface 726 can include an Ethernet card and port for sending and receiving data via an Ethernet-based communications link or network. In another example, communications interface 726 can include a Wi-Fi transceiver for communicating via a wireless communications network. In another example, communications interface 726 can include cellular or mobile phone communications transceivers. In one embodiment, communications interface 726 is a power line communications interface or an Ethernet interface. Memory 708 is shown to include data manager 710, location analyzer 712, occupant profiles 714, preference manager 716, assignment manager 718, proximity safety manager 720, database 722, and signal generator 724.

Data manager 710 may be configured to provide location requests to one or more building occupants throughout building 10 and to occupants near building 10. In some embodiments, data manager 710 provides location requests at certain intervals. For example, a GPS ping is sent out from data manger 710 every hour to all user's associated with location controller 602. This association may be based on registration through an application that allows location controller 602 to receive information relating to the user's and their respective GPS devices (e.g., smartphones, user device 504, etc.). In some embodiments, data manager 710 is configured to provide location requests of specific users.

For example, employees of building 10 may be expecting a client to arrive. In preparation for their arrival, data manger 710 is instructed (e.g., via user command, via an application instruction, etc.) to request the location of the client's user device every time interval (e.g., 5 minutes, 10 minutes, hour, etc.). Then location controller 602 can take preemptive action prior to the arrival of the client, such as sending notifications to employees to update them of the impending arrival of the client (e.g., "Dear Employee A, Client X will be arriving in 15 minutes," etc.).

In another example, a user (e.g., external building occupant 502) can directly send their location information to data manager 710 without receiving a location request. Data manager 710 may receive the location information, determine if any action should be taken given the location of the building occupant, and then act accordingly. This process may be performed if the building occupant wishes to expedite one or more preemptive actions in the event that a location request has not yet been received. Additionally, this process may be performed over an application (e.g., presented on user device 504, etc.) that connects user device 504 and other user devices with location controller 602. Data manager 710 is configured to provide raw location data (e.g., GPS data, etc.) to location analyzer 712.

Location analyzer 712 may be configured to determine the specific location of building occupants and/or the estimated time of arrival of the building occupants. Location analyzer 712 may include software that correlates an estimated distance away from building 10 with an estimated time of arrival. In some embodiments, this is based on historical data of the building occupant(s) travel times, an estimation of typical occupant travel time, or a combination of both.

In one example, location analyzer 712 provides the distance from building 10 and the estimated time of arrival of external building occupant 502 to assignment manager 718, such that assignment manager 718 can determine where to assign external building occupant 502 when they enter building 10 (discussed in more detail below). In another example, location analyzer 712 provides the precise location of internal building occupant 606 to proximity safety manager 720 to determine if the location of internal building occupant 606 is safe for internal building occupant 606 and/or other occupants. Location analyzer 712 is configured to provide the processed location data to preference manager 716, assignment manager 718, and/or proximity safety manager 720.

Preference manager 716 is configured to receive occupant profiled from occupant profiles 714. In some embodiments, location controller 602 stores the profiles of some or all of the occupants (e.g., or future occupants). These profiles may include the preferences of the respective occupant. For example, an internal building occupant 606 logs on to an application and inputs their office temperature preferences, when they want their equipment powered on as they approach building 10, what types of notifications they wish to receive, and how often they prefer to be pinged for their location. Preference manager 716 analyzes this information and combines to with the received processed location data to determine user-preferred actions that need to be taken.

For example, the user profile of internal building occupant 606 indicates that they prefer to have their equipment powered on 10 minutes before arriving at building 10, the temperature set to 70° F., and the lights dimmed to 80% in their office. As such, when preference manager 716 receives the processed location data and the occupant profile of internal building occupant 606, preference manager 716 may provide instructions to signal generator 724 to generate signals that satisfy the user's preferences (assuming the processed location data indicates that they are at an acceptable distance from building 10).

In some embodiments, the preferences are determined by location controller 602 (or another processing device) based on analytics of previous actions taken by the occupants. For example, location controller 602 may determine that internal building occupant 606 prefers a 70° F. office temperature in the mornings. As such, this information may be stored in occupant profiles 714 to be used by preference manager 716. This information may be learned by a machine learning module, neural network, or other types of artificial intelligence. Preference manager 716 is shown to provide these occupant preferences to signal generator 724.

Assignment manager 618 may be configured to receive the processed location data and determine an assignment for the building occupant based on their received location data. In some embodiments, social distancing rules and regulations may be followed to prevent the spread of contagious diseases (e.g., COVID-19, etc.). As such, assigning users to specific locations within building 10 based on the social distancing rules and regulations may be implemented. The systems and methods for assigning workers to specific workspaces may be similar to the systems and methods disclosed in U.S. Patent Application No. 63/112,030 filed Nov. 10, 2020, the entire disclosure of which is incorporated by reference herein. Assignment manager 618 may be configured to provide the workspace, desk, office, and/or other location assignments to signal generator 624.

Proximity safety manager 620 may be configured to determine whether the location of one or more building occupants is considered safe in terms of social distancing rules and regulations. For example, one rule of social distancing may be to remain at least six feet apart from other occupants in building 10. Proximity safety manager 720 may receive processed location data indicating that two or more building occupants are located within 6 ft of each other. In response, location controller 602 may provide notifications to the occupants to socially distance themselves. Other safety requirements may be monitored as well, besides safety concerns regarding social distancing.

For example, proximity safety manager 720 may receive processed location data indicating that internal building occupant 606 is located in an area of building 10 that they are not provided access to be in (e.g., proximity safety manager 720 may determine this based on the occupant profiles 714 stored within location controller 602). In response, signal generator 724 may send an alert to security subsystem 616 and/or provide a notification to the occupant in the restricted area that they are located in a restricted area and that security has been notified. Proximity safety manager 720 is configured to provide one or more safety constraints to signal generator 724.

Signal generator 724 may be configured to receive safety constraints/concerns, assignments, occupant preference, and location information, and provide signals to various components based on the received information. In some embodiments, signal generator 724 generates security updates when proximity safety manager 720 provides information indicative of a security concern (e.g., an unauthorized building occupant in a restricted area, etc.). Signal generator 724 may be configured to combine aspects of some or all of the received information to generate the appropriate control signals and/or notifications.

For example, signal generator 724 may receive occupant preferences that indicate that internal building occupant 606 prefers to be assigned to building zone 604. However, after assignment manager 718 receives the processed location data regarding internal building occupant 606, assignment manger 718 determines that building zone 604 recently had another occupant assigned to that region, and thus building zone 604 is not unsafe until it can be properly sanitized. Signal generator 724 therefore attempts to satisfy the occupant preferences (e.g., assigning them to a nearby building zone, etc.) while adhering to safety concerns.

In some embodiments, location controller 602 is configured to receive location data from a building occupant arriving at building 10 to pick up a package. The building occupant provides the location data to location controller 602. Upon processing the location data and determining that the building occupant is within an appropriate range, location controller 602 may provide a notification to one or more building employees that the building occupant is arriving. Subsequently, the one or more building employees may facilitate the process of picking up the package. For example, the package may be brought to the entrance of building 10 so that it is ready to be picked up by the building occupant (e.g., external building occupant 502, etc.). In the above example, external building occupant 502 may be engaging in a buy-online pickup in-store (BOPIS) transaction.

Location Control Processes

Figure 8:
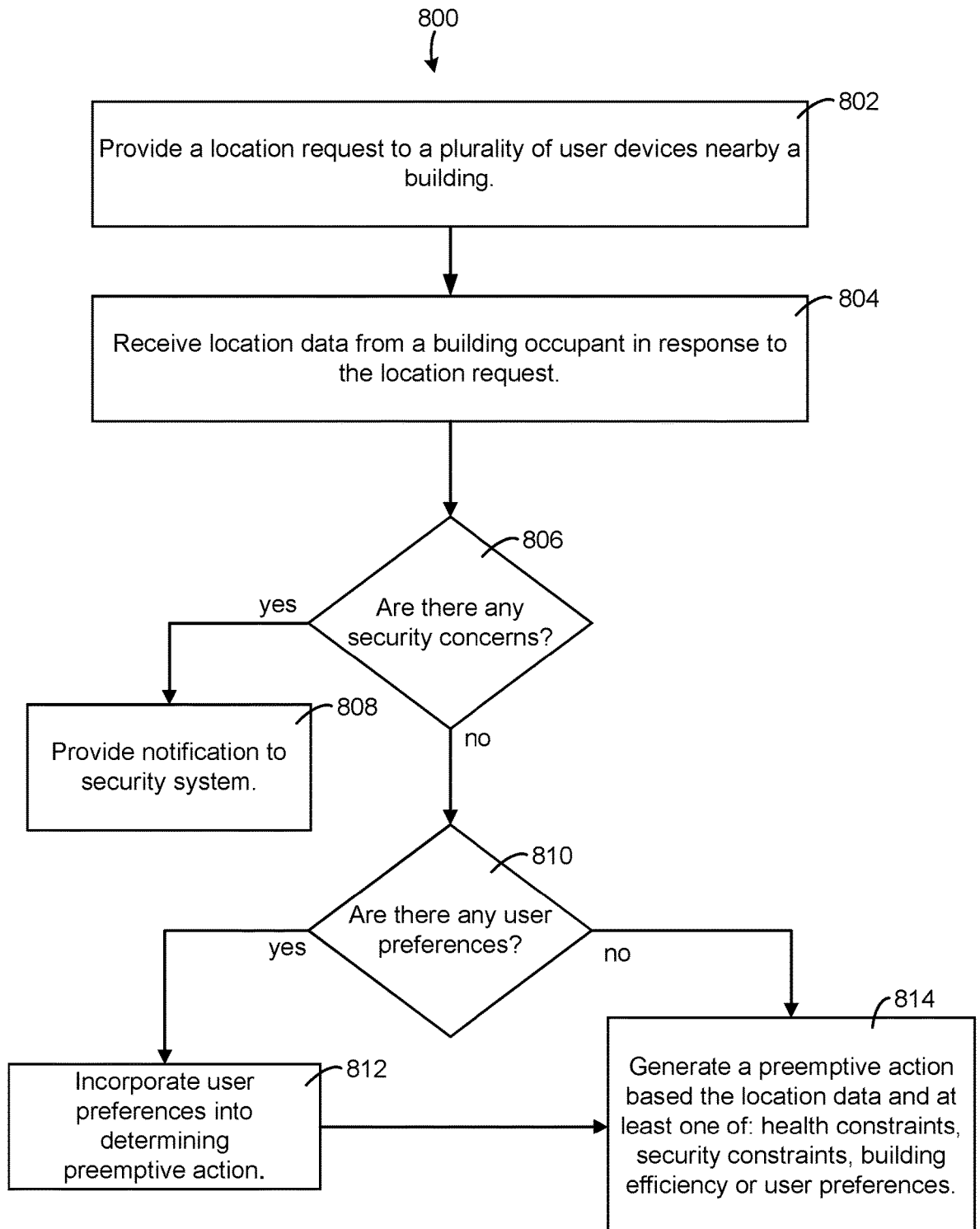
FIG. 8 is a flow diagram of a process for performing preemptive actions based on building occupant location, which can be performed by the controller of FIG. 7, according to some embodiments.

Referring now to FIG. 8, a process 800 for performing preemptive actions in response to determining the location of one or more building occupants is shown, according to some embodiments. Process 800 may be performed by any of the processing components described herein, such as location controller 602. Process 800 is shown to include providing a location request to a plurality of user devices nearby a building (step 802). In some embodiments, data manager can provide the location requests to one or more user devices and receive the subsequent location data. As discussed above, this can be performed in a singular instance, continually, or over intervals of time.

Process 800 is shown to include determining if there are any security concerns (step 806) and providing a notification to security system (step 808). After processing the data, location analyzer 712 may provide the processed location data to proximity safety manager 720. Proximity safety manager 720 may be configured to determine any safety concerns related to the processed location data, such as location in an unauthorized area. Upon determining that there are safety concerns, signal generator 724 may provide an alert to security subsystem 616.

Process 800 is shown to include determining if there are any user preferences step (step 810) and incorporating user preferences into determining preemptive action (step 812). In some embodiments, preference manager 716 generates a set of actions based on occupant preferences from occupant profiles 714 and the processed location data. In some embodiments, the occupant preferences cannot always be satisfied by location controller 602 in the event that the preferences interfere with one or more constraints that take priority (e.g., security, building efficiency, etc.). In response to determining user preferences that do not interfere with one or more other constraints that take priority, signal generator 724 may generate a preemptive action based the location data and at least one of: health constraints, security constraints, building efficiency or user preferences (step 814).

Figure 9:
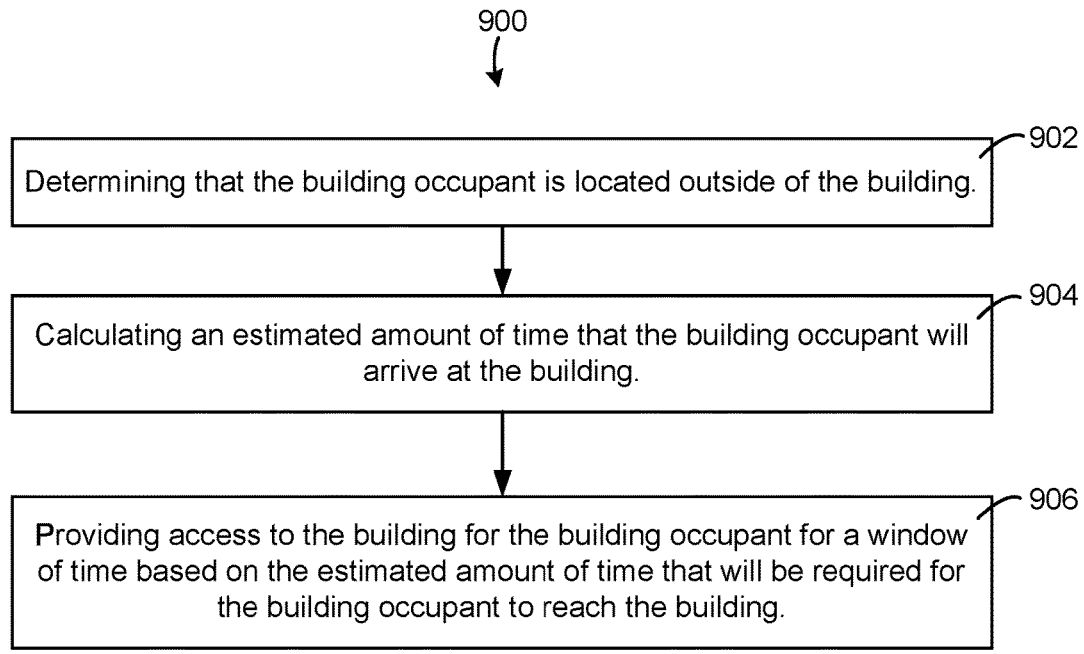
FIG. 9 is a flow diagram of a process for performing preemptive actions, which can be performed by the controller of FIG. 7, according to some embodiments.

Referring now to FIG. 9, a process 900 for generating a preemptive action is shown, according to some embodiments. Process 900 may be a specific implementation of step 814 as described above with reference to FIG. 8. Process 900 may be performed by any of the processing components described herein, such as location controller 602.

Process 900 is shown to include determining that the building occupant is located outside of the building (step 902). In some embodiments, location analyzer 712 can determine whether the building occupant is located outside of the building or inside of the building based on the received location data. Process 900 is shown to include calculating an estimated amount of time that the building occupant will arrive at the building (step 904). Location analyzer 712 may be configured to determine the specific location of building occupants and/or the estimated time of arrival of the building occupants. Location analyzer 712 may include software that correlates an estimated distance away from building 10 with an estimated time of arrival.

Process 900 is shown to include providing access to the building for the building occupant for a window of time based on the estimated amount of time that will be required for the building occupant to reach the building (step 906). Based on the estimated time of arrival, signal generator 724 may adjust the control actions accordingly. For example, signal generator may provide a control signal to the entrance of building 10 that allows the entrance to accept the badge of external building occupant 502 for a period of time based on the estimated time of arrival.

Figure 10:
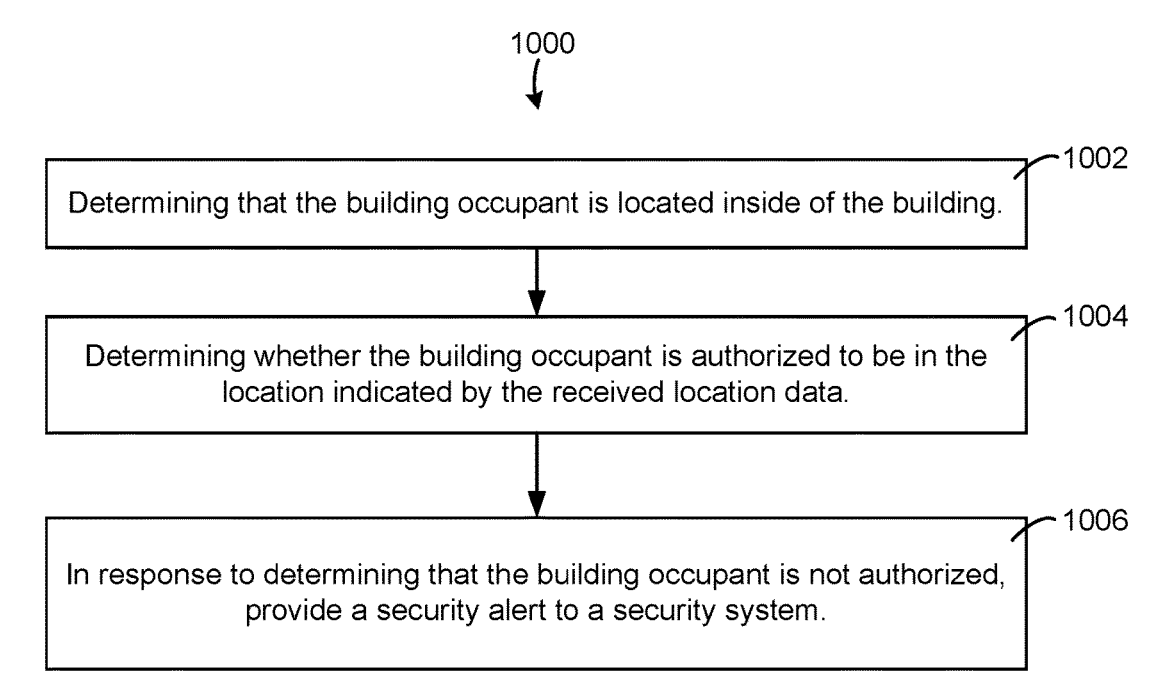
FIG. 10 is a flow diagram of a process for performing preemptive actions, which can be performed by the controller of FIG. 7, according to some embodiments.

Referring now to FIG. 10, a process 1000 for generating a preemptive action is shown, according to some embodiments. Process 1000 may be a specific implementation of step 814 as described above with reference to FIG. 8. Process 1000 may be performed by any of the processing components described herein, such as location controller 602.

Process 1000 is shown to include determining that the building occupant is located inside of the building (step 1002). In some embodiments, location analyzer 712 can determine whether the building occupant is located outside of the building or inside of the building based on the received location data. Process 1000 is shown to include determining whether the building occupant is authorized to be in the location indicated by the received location data (step 1004). Proximity safety manager 720 may be configured to compare the location of the building occupant with a database of authorized locations for that building occupant and determine whether that building occupant is allowed in the present location. If not, location controller 602 may provide a security alert to a security system (step 1006).

In some embodiments, the systems and methods disclosed herein can be implemented for an opt-n loyalty customer of a retailer. For example, location controller 602 can receive an indication that the building occupant is approaching building 10. In response to the building occupant passing a first distance range (e.g., a geo-fence, etc.), the notification may be sent to in-building employees that the loyalty customer is approaching a pre-defined distance. This notification may include preparing a package for the employee, preparing a greeting for the employee, or any other type of preemptive action that can facilitate a more efficient experience for the user. Of course, any type of preemptive action for any type of building occupant is considered in the systems and methods disclosed herein, and the embodiments discussed above are merely exemplary.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. "Non-transitory" excludes only mere signals in space, and includes all other forms of computer-readable storage media.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A controller for initiating actions in a building management system (BMS) based on a location of a building occupant, the controller comprising a processing circuit comprising one or more processors and memory storing instructions that, when executed by the one or more processors, cause the one or more processors to perform operations comprising:
   receive location data relating to the building occupant located at a first location outside of a building;
   in response to determining the first location is within a first distance range of the building, provide control signals to a first subsystem of the BMS;
   receive location data relating to the building occupant located at a second location outside of the building; and
   in response to determining that the second location is within a second distance range of the building, provide control signals to a second subsystem of the BMS, the control signals causing the second subsystem to authorize a badge or mobile device associated with the building occupant for a predetermined window of time, the second subsystem providing access to the building for the building occupant in response to detecting the badge or mobile device at an access point of the building during the predetermined window of time;
   wherein the first distance range is a different distance than the second distance range, and wherein the first subsystem is configured to operate different building equipment than the second subsystem.

2. The controller of claim 1, wherein providing control signals to the first subsystem of the BMS comprises:
   notifying one or more building employees located within the building of the first location of the building occupant; and
   preparing an item for pickup by the building occupant prior to the building occupant reaching the building.

3. The controller of claim 1, wherein:
   providing control signals to the first subsystem comprises initiating a first preemptive action that prepares a zone of the building for arrival of the building occupant based on preferences of the building occupant; and
   providing control signals to the second subsystem comprises initiating a second preemptive action that facilitates entrance of the building occupant into the building.

4. The controller of claim 1, wherein providing control signals to the first subsystem of the BMS comprises:
   receiving a set of preferences relating to a comfortability of the building occupant within a building zone, the set of preferences comprising at least one of a preferred temperature, a preferred humidity percentage, or a preferred light setting; and
   providing control signals to the first subsystem to satisfy at least one preference in the set of preferences within the building zone.

5. The controller of claim 1, wherein providing control signals to the second subsystem of the BMS comprises:
   calculating an estimated amount of time until the building occupant will arrive at the building; and
   providing access to the building for the building occupant for a window of time based on the estimated amount of time.

6. The controller of claim 1, wherein providing control signals to the second subsystem of the BMS comprises:
   determining that one or more user preferences indicate that the building occupant prefers to be assigned to a first building zone; and
   in response to determining that the first building zone is hazardous, assigning the building occupant to a second building zone.

7. The controller of claim 1, wherein:
   the first subsystem of the BMS is a lighting subsystem or a heating, ventilation, or air conditioning (HVAC) or an electrical subsystem; and
   the second subsystem of the BMS is a security subsystem or a safety subsystem.

8. The controller of claim 1, wherein:
   providing control signals to the first subsystem comprises providing control signals to adjust an HVAC setpoint associated with the building; and
   providing control signals to the second subsystem comprises providing a power signal to an electronic device of an electronics system; and wherein:
   the first distance range is located such that an estimated time of arrival of the building occupant to the building from the first distance range is substantially similar to a time required to achieve the HVAC setpoint, and
   the second distance range is located such that an estimated time of arrival of the building occupant to the building from the second distance range is substantially similar to a time required to achieve a completion of powering on based on the provided power signal.

9. The controller of claim 1, wherein the controller is further configured to:
   calculate a time between determining the first location is within a first distance range of the building and determining that the second location is within a second distance range of the building; and
   in response to determining the calculated time is greater than a predetermined value, provide control signals that mitigate the provided control signals to the first subsystem of the BMS.

10. The controller of claim 1, wherein the processing circuit is further configured to:
    receive location data from a plurality of building occupants, the plurality of building occupants comprising the building occupant; and
    pinging a user device of the building occupant to determine global positioning satellite (GPS) data for the first location and the second location.

11. A method for initiating actions for a building management system (BMS) based on a location of a building occupant, the comprising:
    receiving location data relating to the building occupant located at a first location outside of a building;
    in response to determining the first location is within a first distance range of the building, providing control signals to a first subsystem of the BMS;
    receiving location data relating to the building occupant located at a second location outside of the building; and
    in response to determining that the second location is within a second distance range of the building, providing control signals to a second subsystem of the BMS, the control signals causing the second subsystem to authorize a badge or mobile device associated with the building occupant for a predetermined window of time, the second subsystem providing access to the building for the building occupant in response to detecting the badge or mobile device at an access point of the building during the predetermined window of time;

wherein the first distance range is a different distance than the second distance range, and wherein the first subsystem is configured to operate different building equipment than the second subsystem.

12. The method of claim 11, wherein providing control signals to the first subsystem of the BMS comprises:
   notifying one or more building employees located within the building of the first location of the building occupant; and
   preparing an item for pickup by the building occupant prior to the building occupant reaching the building.

13. The method of claim 11, wherein:
   providing control signals to the first subsystem comprises initiating a first preemptive action that prepares a zone of the building for arrival of the building occupant based on preferences of the building occupant; and
   providing control signals to the second subsystem comprises initiating a second preemptive action that facilitates entrance of the building occupant into the building.

14. The method of claim 11, wherein providing control signals to the first subsystem of the BMS comprises:
   receiving a set of preferences relating to a comfortability of the building occupant within a building zone, the set of preferences comprising at least one of a preferred temperature, a preferred humidity percentage, or a preferred light setting; and
   providing control signals to the first subsystem to satisfy at least one preference in the set of preferences within the building zone.

15. The method of claim 11, wherein providing control signals to the second subsystem of the BMS comprises:
   calculating an estimated amount of time until the building occupant will arrive at the building; and
   providing access to the building for the building occupant for a window of time based on the estimated amount of time.

16. The method of claim 11, wherein providing control signals to the second subsystem of the BMS comprises:
   determining that one or more user preferences indicate the building occupant prefers to be assigned to a first building zone; and
   in response to determining that the first building zone is hazardous, assigning the building occupant to a second building zone.

17. A building management system (BMS) for initiating actions based on a location of a building occupant, the BMS comprising one or more non-transitory computer-readable storage media having instructions stored thereon that, upon execution by one or more processors, cause the one or more processors to perform operations comprising:
   receive location data relating to the building occupant located at a first location outside of a building;
   in response to determining the first location is within a first distance range of the building, provide control signals to a first subsystem of the BMS;
   receive location data relating to the building occupant located at a second location outside of the building; and
   in response to determining that the second location is within a second distance range of the building, provide control signals to a second subsystem of the BMS, the control signals causing the second subsystem to authorize a badge or mobile device associated with the building occupant for a predetermined window of time, the second subsystem providing access to the building for the building occupant in response to detecting the badge or mobile device at an access point of the building during the predetermined window of time;
   wherein the first distance range is a different distance than the second distance range, and wherein the first subsystem is configured to operate different building equipment than the second subsystem.

18. The one or more non-transitory computer-readable storage media of claim 17, wherein providing control signals to the first subsystem of the BMS comprises:
   notifying one or more building employees located within the building of the first location of the building occupant; and
   preparing an item for pickup by the building occupant prior to the building occupant reaching the building.

19. The one or more non-transitory computer-readable storage media of claim 17, wherein:
   providing control signals to the first subsystem comprises initiating a first preemptive action that prepares a zone of the building for arrival of the building occupant based on preferences of the building occupant; and
   providing control signals to the second subsystem comprises initiating a second preemptive action that facilitates entrance of the building occupant into the building.

20. The one or more non-transitory computer-readable storage media of claim 17, wherein the building occupant is an opt-in loyalty customer of a retailer.

* * * * *